United States Patent Office 3,274,309
Patented Sept. 20, 1966

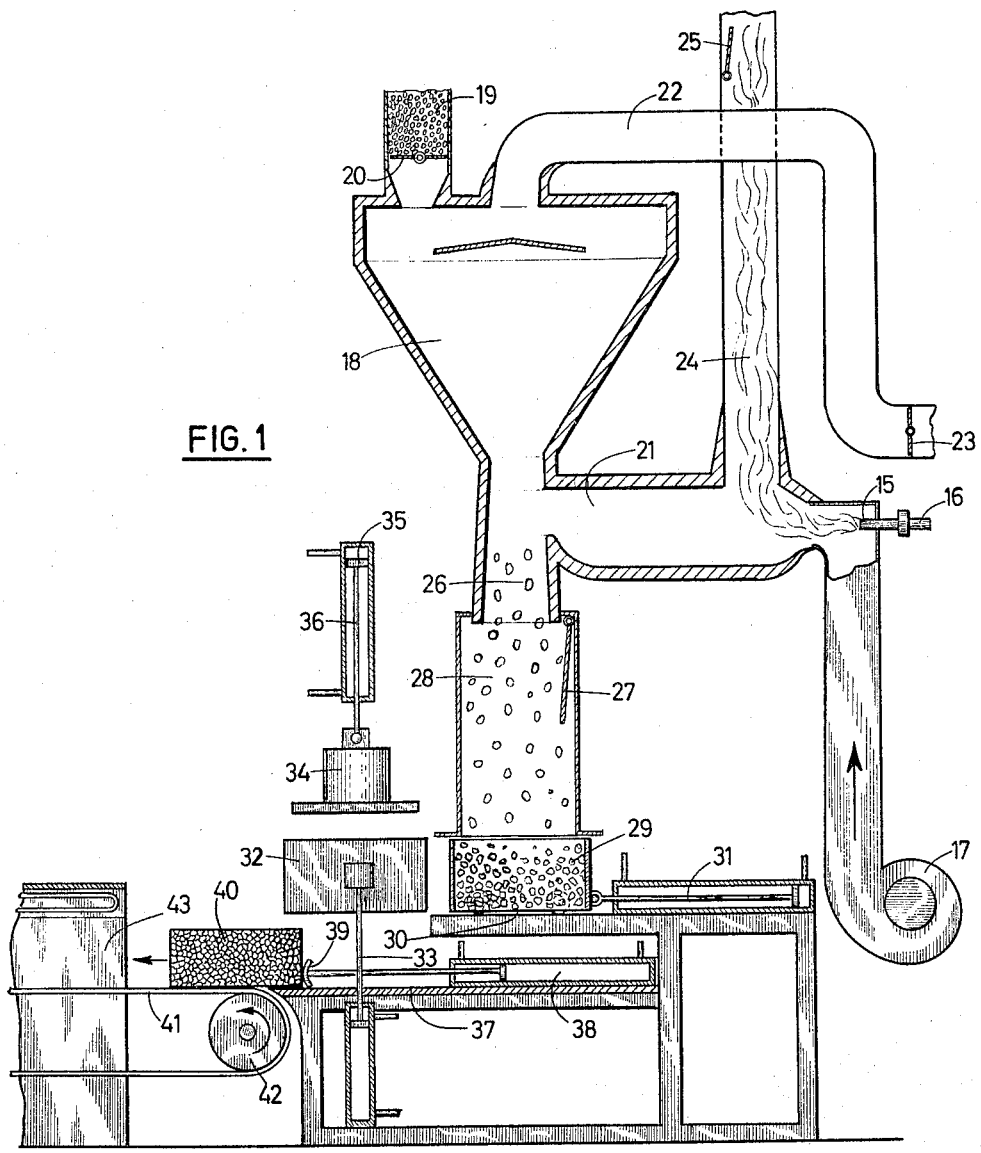

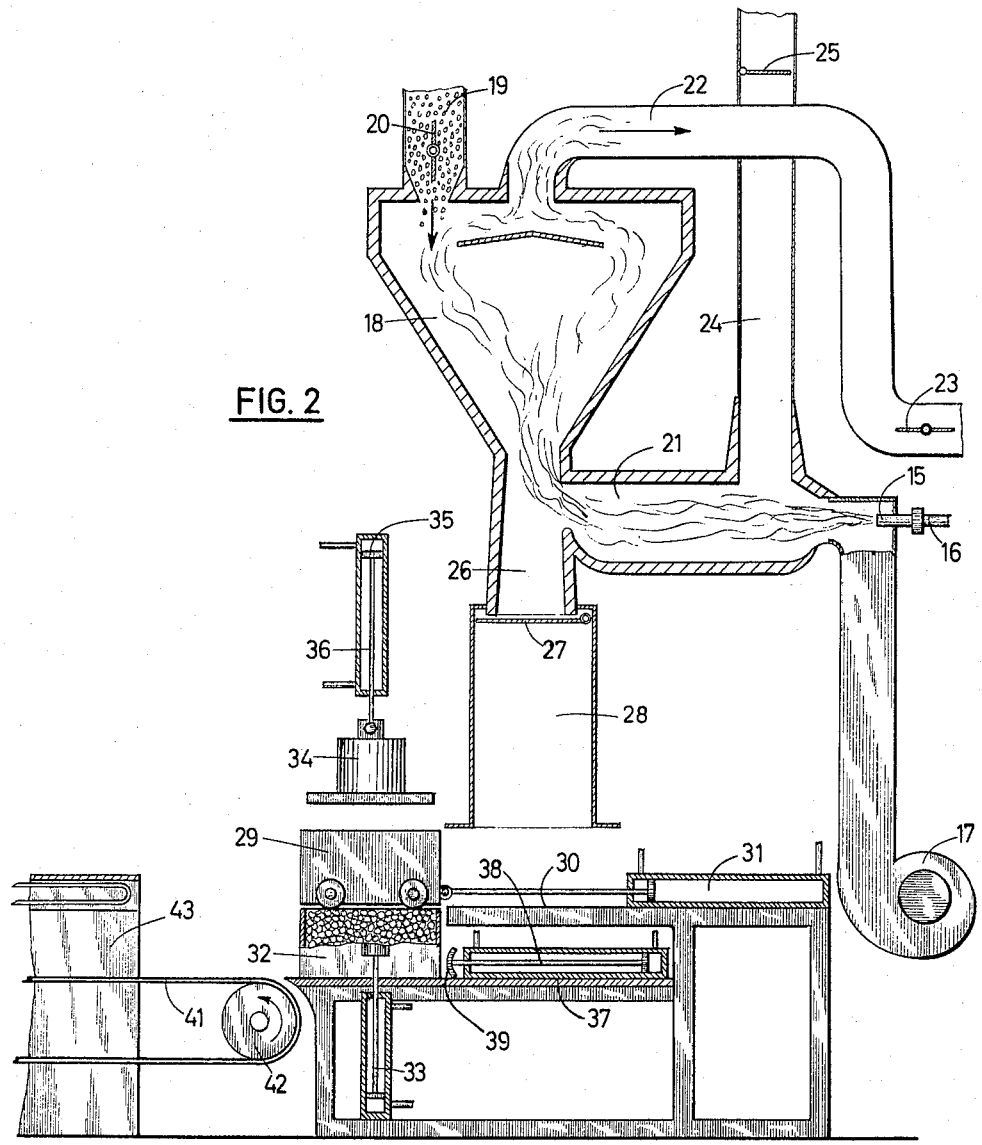

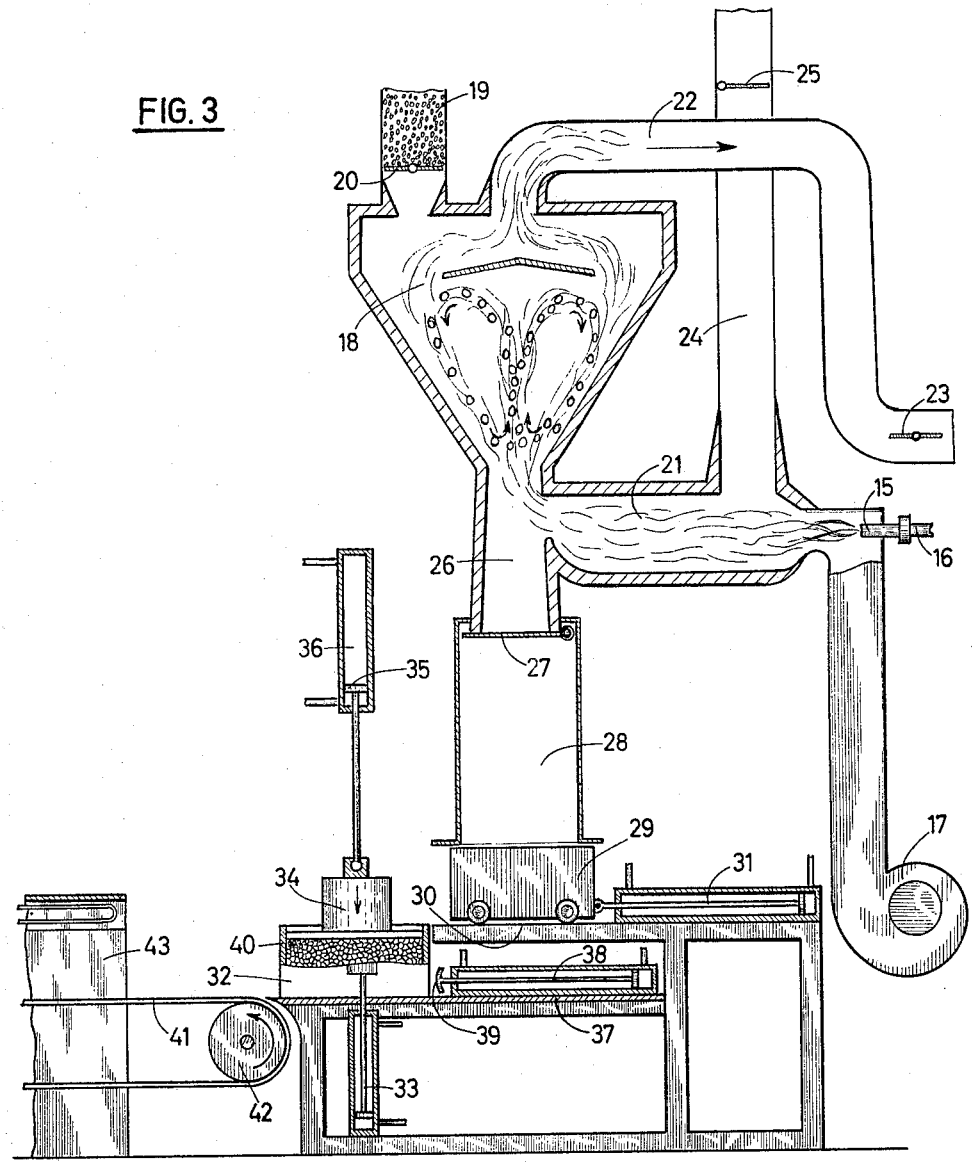

3,274,309
METHOD FOR PRODUCING BUILDING ELEMENTS AND ESPECIALLY BUILDING STONES OF SINTERED MATERIAL OR THE LIKE
Walter Schreieck, 52 Hauptstrasse, Trosdorf, Upper Franconia, Germany
Filed June 1, 1965, Ser. No. 460,434
2 Claims. (Cl. 264—42)

This application is a continuation-in-part of my copending application Serial No. 193,357 filed May 7, 1962.

The invention relates to a method for producing building elements and especially building stones of sintered material or the like.

In the conventional methods for producing building elements, hollow blocks and similar building materials, the same are produced, for example, of heavy concrete by the use of sand and gravel as aggregates and cement as a binder, while-light-weight building materials are produced, for example, by the use of pumice as an aggregate and cement as a binder. In more recent years, light-weight building elements of all kinds have also been produced in which the aggregates consist of sintered or baked materials, such as sintered pumice, expanded slag, expanded clay and the like, while the binders consist of cement or clay.

Aside from the provision of the binders which are required in any of the conventional methods, these methods necessitate the following procedures for producing the mentioned building elements:

(1) Mixing of the aggregates, such as sand, gravel, sintered materials or the like with the binders, such as cement, lime, plaster, clay or the like;

(2) Introducing this mixed material into molds and compacting the material therein; and (3) Depositing for building elements on large storage surfaces for handening the same or erecting suitable apparatus for hardening the building elements artifiicially, such as steam hardening chambers of kilns for claybound building materials.

The above methods are very expensive, both as to the required apparatus and the opening procedure to be followed. For example, the operation of merely mixing the aggregates with the binder requires the erection of expensive silos for cement, as well as mixing and conveying apparatus aside from the expense for water and the necessary supply and distributing lines therefor.

The apparatus for the compacing operation and the costs thereof cannot be avoided in any case and need not be considered. The setting and hardening process of cement-bound building materials requires about 28 days. Depending upon the weather, such building elements when hardening outside or in sheds et cetera require a period of 4 to 10 days until the elements are ready for shipment or use. The hardening process may be accelerated if artificial drying apparatus such as steam curing equipment is provided, but such equipment is quite expensive.

Clay-bound building materials require a kiln, such as an annular kiln, shaft kiln, tunnel kiln or the like, and such kilns consume a considerable amount of energy. The investments required for such apparatus are extremely high. Furthermore, for storing the materials while hardening and for erecting the kilns, large parcels of land are an absolute prerequisite. The conventional methods of producing the mentioned building elements therefore involve considerable expense, very high operating costs and costs for personnel, as well as large parcels of land. The long period necessary for storing the materials from the time when they are removed from the molds to the time they are ready for shipment and use also renders these methods quite uneconomical.

It is a principal object of the present invention to provide a method for producing building elements and especially building stones of baked or sintered materials, preferably expanded clay, which does not require any aggregates or binders and permits the building elements to be produced within a fraction of the time previously required.

The above object is attained by utilizing the pyroplastic condition of the material at the time immediately following its removal from the kiln by introducing the material in a redhot condition without any binders or aggregates into the molds for producing building stones.

The present invention is based upon the following:

Baked and sintered materials such as sintered pumice, expanded clay, expanded slag or the like, are produced at temperatures between 900° and 1500° C. and red-hot material and leaves the kiln at very high temperatures and in a pyroplastic condition especially at the outer surfaces thereof. If this material, immediately upon removal from the kiln, is introduced without any further treatment into molds and is then compacted in the mold in a conventional manner prior to solidification, such as by being compressed, tamped, jar-rammed or vibrated, the material will be intimately combined without the addition of binders as soon as the material has completely solidified, namely, within a few minutes. The building elements which are thus attained have the same quality, compressive strength and range of use as elements which have been produced by the use of aggregates and binders.

The present method obviates the following requirements of the conventional methods:

(1) All aggregates;
(2) All silos, mixing apparatus and conveying apparatus for the aggregates;
(3) Large parcels of land for depositing the building materials for a long time while hardening; and
(4) The entire hardening period, since the present building materials when produced are ready for shipment and use within a few minutes.

The saving in investments, operating costs and personnel costs attained by the invention merely by the omission of the operating steps of applying and mixing the binders and aggregates, and of the hardening process or the period during which the material must remain in the plant from the time of molding to the time when it is ready for shipment and use amounts to 45 or 50% of the former costs.

Generally, the method of producing light-weight building elements of a predetermined size and shape and of cellular structure by molding granulated bloated mineral material after heating the material to a state wherein the interior of the granules if bloated while the outer surface is plasticized, comprises the steps of feeding a batch of unbloated granulated material into a reaction chamber, introducing a stream of hot gas into the chamber, maintaining the granules of the batch in suspension in the stream of hot gas until the granules reach the state in which the interior is bloated and the outer surface plasticized, arresting the flow of the stream of hot gas into the chamber, withdrawing the bloated batch from the reaction chamber, immediately filling the bloated granules of the batch into at least one mold of a predetermined size and shape, compacting the granules within the mold for increasing the density of the molded material, cooling the molded material to a stable condition, and removing the thus produced light-weight building element from the mold.

The various objects and advantages of the present invention will become more clearly apparent from the following detailed description of the method and the apparatus for carrying out this method as illustrated diagrammatically in three different stages of its operation in the accompanying drawings, in which:

FIGURE 1 is a fragmentary view in side elevation and partly in section, of the apparatus according to the invention in the stage wherein the contents of the reaction chamber are filled into a charging carriage, while at the same time a finished stone is deposited on a conveyor belt;

FIGURE 2 is view similar to FIGURE 1 showing the apparatus in the stage of charging a molding box;

FIGURE 3 is a view similar to FIGURE 1 and shows the apparatus in the stage of compacting the material in the molding box.

For treating the expansible material to convert the material into the pyroplastic condition in which it is employed, any suitable method and apparatus may be used, and such a preliminary method and apparatus per se do not constitute a feature of the invention. For the purpose of explaining the present invention it is, however, assumed that this preliminary treatment is carried out by the method and apparatus as disclosed in copending application Serial No. 83,251, filed January 17, 1961, now Patent No. 3,118,658 dated January 21, 1964.

In the drawings, a burner 15 is supplied with fuel through a line 16, while the necessary combustion air is supplied by a blower 17. A reaction chamber 18 can be charged intermittently with a granular expansible material through a chute 19 provided with a control member 20. As illustrated in FIGURES 2 and 3, the hot gases enter the reaction chamber 18 through a channel 21 and are discharged therefrom through a channel 22 located at the upper end of the chamber and which is first opened by means of a flap 23. The elements of the apparatus following the channel 23 are not shown in the drawings.

The channel 21 is connected to a chimney or stack 24 which is at first closed by a flap 25. During its heat treatment, the expansible material is subjected by the hot gases flowing from the channel 21 into the reaction chamber 18 to a strong vertical circulatory motion, as indicated in FIGURE 3. A discharge outlet 26 at the lower end of the reaction chamber 18 is provided with a flap 27 which is at first closed. The outlet 26 is connected to a chute 28 which is provided with an open lower end. A charging carriage 29 which is open at the top and at the bottom is movable below the open lower end along a table surface 30 by means of a piston 31 which may be reciprocated within a hydraulic or pneumatic cylinder. Directly behind the end of the table surface 30 is a molding box 32 having an open upper end and which is adapted to be raised and lowered hydraulically or pneumatically by a piston-cylinder assembly 33.

For compacting the hot pyroplastic material within the molding box 32, a vertically disposed plunger 34 is provided and is adapted to enter the open upper end of the molding box. The plunger can be raised and lowered by a piston 35 in a hydraulic or pneumatic cylinder 36. This compacting operation may be carried out either by a continuous compression stroke or by repeated tramping strokes of the plunger 34 or even by vibratory motions thereof. A second table 37 is located below the table 30 and carried by another hydraulic or pneumatic cylinder 38. The piston rod of the piston in the cylinder 38 is provided with a bumper 39 on its outer end adapted to press against a finished building stone 40 to push the same along the surface of the table 37 toward and upon a conveyor belt 41 which is guided by a roller 42 and leads into a cooling tunnel 43. At the outlet side of the cooling tunnel 43, a further roller (not shown) may be provided for driving the conveyor belt 41.

In the next stage of the operation, as illustrated in FIGURE 2, the flap 27 is again closed and the flap 20 is opened so that the reaction chamber 18 will be supplied with a new charge of expansible material. The flap 23 is again opened so that the gas can be discharged through the channel 22. The charging carriage 29 is then shifted toward the left by the piston in cylinder 31 until it is located above the molding box 32 which in the meantime has been lowered by the piston in cylinder 33. The expanded pyroplastic material then drops through the open lower end of the charging carriage 39 into the molding box 32.

After the reaction chamber 18 has been charged with a sufficient amount of fresh material, the flap 20 is closed. The third stage of the method, as illustrated in FIGURE 3, has been reached and in which initially the empty charging carriage 29 is retracted by the piston in the cylinder 31 to its original position underneath the chute 28, whereupon the plunger 34 is forced downwardly to compact the material in the molding box 32.

In the fourth stage of the method, which may be understood without illustration, the plunger 34 at first remains in its lowered position to hold the finished stone 40 in a fixed position on the table 37 to permit the molding box 32 to be elevated by the piston 33 and thus be removed from the stone 40. Thereafter, the plunger 34 is also raised so that the finished stone rests freely on the table 37 and may then be pushed by the bumper 39 upon the conveyor belt 41 which carries it into and through the cooling tunnel 43. After this cooling stage, the stones 40 are ready for immediate shipment or use.

It will be appreciated that the present method comprises introducing a batch of unbloated granulated material into the reaction chamber, maintaining the granules in suspension in the hot gas stream until the interior of the granules is bloated and the outer surface plasticized, arresting the flow of the hot gas stream, withdrawing the bloated material from the reaction chamber, immediately filling the material into a mold, compacting the material in the mold to increase the density thereof, cooling the molded material to a stable condition and removing the produced building element from the mold.

By virtue of the invention, all of the granules are well and evenly bloated and this is true when the grains are not all of the same regular size. The batch of granules is maintained in suspension in the hot gas stream until the bloating action has been completed with certainty. Following the bloating step, the batch is introduced immediately and directly into at least one mold which takes at most a few seconds and the mold is filled with a material having the same temperature across its entire filled in height. This is most important since strains or stresses cannot occur as the bloated mass has not been gradually introduced into the mold but has the same temperature throughout and no annealing is necessary.

Although my invention has been described above and illustrated with reference to the preferred embodiment thereof, I wish to have it understood that it is in no way limited to the details of such embodiment, but is capable of numerous modifications within the scope of the appended claims.

Having thus fully disclosed by invention, what I claim is:

1. The method of producing light-weight building elements of predetermined size and shape and of cellular structure by molding granulated bloated mineral material after heating said material to a state wherein the interior of the granules is bloated while the outer surface is plasticized, comprising the steps of feeding a batch of unbloated granulated material into a reaction chamber, introducing a stream of hot gas into the chamber, introducing a stream of hot gas into the chamber, maintaining the granules of the batch in suspension in the stream of hot gas until the granules reach the state in which the interior is bloated and the outer surface plasticized, arresting the flow of the stream of hot gas into said reaction chamber, withdrawing the bloated batch from said reaction chamber, immediately filling the bloated granules of the batch into at least one mold of predetermined size and shape, compacting the granules within said mold for increasing the density of the molded material, cooling the molded material to a stable condition and removing the thus produced light-weight building element from the mold.

2. The method of producing light-weight building elements of predetermined size and shape and of cellular structure by molding granulated bloated mineral material after heating said material to a state wherein the interior of the granules is bloated while the outer surface is plasticized, comprising the steps of feeding a batch of unbloated granulated material into a reaction chamber, introducing a stream of hot gas into the chamber, maintaining the granules of the batch in suspension in the stream of hot gas until the granules reach the state in which the interior is bloated and the outer surface plasticized, arresting the flow of the stream of hot gas into the chamber, withdrawing the bloated batch from the reaction chamber, immediately filling the bloated granules of the batch into at least one mold of predetermined size and shape, compacting the granules within the mold for increasing the density of the molded material, removing the thus formed light-weight building element from the mold after the material has attained a stable condition, and passing the building element through a cooling tunnel for cooling the same.

References Cited by the Examiner

UNITED STATES PATENTS 3,056,184  10/1962  Blaha _____ 264—125

ROBERT F. WHITE, *Primary Examiner.*

R. B. MOFFITT, *Assistant Examiner.*